United States Patent Office 3,573,303
Patented Mar. 30, 1971

3,573,303
GUANIDINE DERIVATIVES AND THEIR
PREPARATION
Don Pierre Rene Lucien Giudicelli, Fontenay-sous-Bois, and Henry Najer, Paris, France, assignors to Les Laboratories Dausse, Paris, France
No Drawing. Filed Sept. 18, 1968, Ser. No. 760,670
Int. Cl. C07d 51/76
U.S. Cl. 260—250          2 Claims

ABSTRACT OF THE DISCLOSURE

The pyrazinoyl-guanidines of the formula:

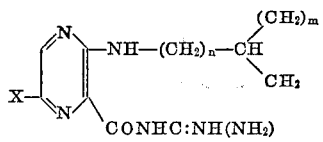

in which X is halogen or trifluoromethyl, $m$ is 1 to 4 and $n$ is 0 to 3 and their salts are useful as salidiuretics.

---

The present invention provides the pyrazinoylguanidines of the formula:

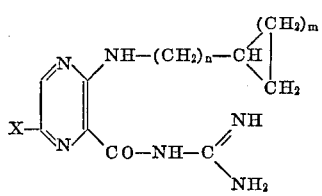

in which X is a halogen (chlorine, bromine, fluorine or iodine) or a trihalogenomethyl radical (for example trichloromethyl or trifluoromethyl); $m$ is an integer from 1 to 4; and $n$ is an integer from 0 to 3 (for example 0, 1 or 2), and their acid addition salts with all pharmaceutically acceptable inorganic and organic acids.

These compounds are made by reacting guanidine with an ester of pyrazinoic acid of the formula:

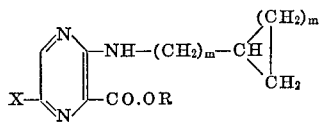

in which X, $m$ and $n$ are as hereinbefore defined and R is a lower alkyl group. The reaction is preferably carried out in an anhydrous alcohol such as methyl alcohol, the solution being rapidly heated to 40° C. and immediately cooled.

To prepare the esters of Formula II, it is not possible to use the conventional method of reacting, without the use of an intermediary medium, an ester of the formula:

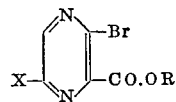

with an excess of an alicyclic amine of the formula:

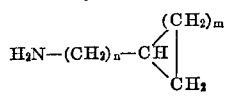

regardless of the temperature chosen for the reaction. At ambient temperature, a compound of formula:

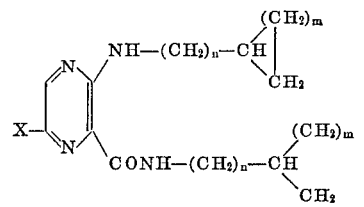

is obtained, while at a temperature of —10° C. a compound of formula:

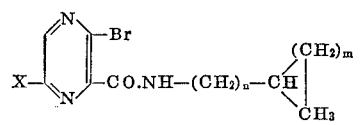

is formed.

On the other hand, and completely unexpectedly, the desired compound of Formula II is obtained easily and in good yield by reacting the ester of Formula III with the amine of Formula IV in dimethylsulphoxide.

The salts of the compounds of Formula I are prepared by bringing together the selected acid and base in the desired amounts, or by any known process for the preparation of inorganic or organic acid addition salts.

The invention furthermore provides salidiuretic compositions which comprise a compound of Formula I or a pharmaceutically acceptable acid addition salt thereof in association with a pharmaceutical carrier.

The compounds of Formula I and their salts increase the urinary excretion of water and of sodium without increasing that of potassium which they even sometimes tend to reduce. They are thus clearly distinguished from other diuretics and especially from benzothiadiazine derivatives and dihydro-benzothiadiazine derivatives, the favourable effects of which on the elimination of water and sodium are accompanied by a loss of potassium which has to be compensated by ingestion or injection of potassium salts to avoid the appearance of serious troubles of hypokaliaemic origin.

The new compounds are even able, when administered in combination with other diuretics, especially with benzothiadiazine derivatives and dihydrobenzothiadiazine derivatives, to increase the effects on the elimination of water and of sodium whilst annulling the loss of potassium usually caused by these latter materials when administered alone.

Surprisingly, (6-chloro-3-cyclopropylmethylaminopyrazinoyl)-guanidine is much more active than the compounds of the formula:

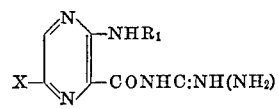

in which X has the same significance as in Formula I, and $R_1$ represents either hydrogen, or a lower alkyl residue having a straight or branched chain, or a substituted or unsubstituted aryl residue or a substituted or unsubstituted aralkyl residue.

This superiority is all the more remarkable in that it is connected neither with the number of carbon atoms in the cyclopropylmethyl radical nor with the presence of a cyclopropyl residue in this substituent. In fact, the 6-halogeno-3-N-butylamino-2-pyrazinoyl-guanidines on the one hand, and the 6-halogeno-3-N-cyclopropylamino-2-pyrazinoyl-guanidines on the other are much less active than (6-chloro-3-cyclopropyl methyl amino-pyrazinoyl)-guanidine.

Furthermore, this last compound has the advantage of low toxicity. By way of example, its 50 percent lethal dose administered intraperitoneally is 380 mg./kg. (95% fiducial; limits: 316–456) in mice, whilst that of its analogue of Formula VIII in which $R_1$=H and X=Cl is 208 mg./kg. (95% fiducial; limits: 179–241) under the same experimental conditions. As a result the therapeutic index of the former compound is higher than that of its analogue, which is also less active in inhibiting loss of potassium following the administration of benzothiadiazine or dihydrobenzothiadiazine diuretics.

The compounds of Formula I may by used in human therapy either alone or combined with any medicine which suffers from the disadvantage of causing an exaggerated urinary elimination of potassium, and more especially the cortico-steroids or the diuretics derived from benzothiadiazine and dihydrobenzothiadiazine.

For therapeutic use, the compounds of Formula I are preferably administered orally in any appropriate pharmaceutical form. The unit does may contain from 1 to 500 mg., usually 50–450 mg., of the compound of Formula I, and the number of these doses may be 1 to 3 daily.

The compounds of Formula I may also be administered other than orally.

The examples which follow illustrate the invention.

EXAMPLE 1

(a) Methyl 6-chloro-3-cyclopropylamino-pyrazinoate

A solution of 6.4 g. (0.025 g. mol) of methyl 6-chloro-3-bromo-pyrazinoate in 40 ml. of dimethylsulphoxide is introduced into a 50 ml. three-necked flask fitted with a mechanical stirrer, a dip thermometer and a reflux condenser surmounted by a calcium chloride guard tube. 2.85 g. (0.05 g. mol.) of cyclopropylamine are added and the mixture is heated for one hour to 65° C. with stirring. It is then left for 3 hours at ambient temperature and thereafter poured onto 75 g. of crushed ice while the temperature is kept below +10° C. by an external ice bath. The mixture is cooled to 0° C. and the precipitate is filtered off, washed with water and recrystallised from 15 ml. of absolute ethanol. 3.4 g. (60% yield ) of methyl 6-chloro-3-cyclopropylamino-pyrazinoate are thus obtained, as a lemon-yellow crystalline compound which melts at 78–80° C.

Analysis.—Calculated for $C_9H_{10}ClN_3O_2$ (percent) (M.W.=227.5): C, 47.47; H, 4.40; Cl, 15.60; N, 18.46. Found (percent): C, 47.09; H, 4.40; Cl, 15.68; N, 18.53.

(b) (6-chloro-3-cyclopropylamino-pyrazinoyl) guanidine 1.15 g. (0.05 g. atom) of sodium are dissolved in 130 ml. of anhydrous methyl alcohol in a 250 ml. flask fitted with a condenser surmounted by a calcium chloride guard tube. The mixture is allowed to cool and 4.8 g. (0.05 g. mol) of guanidine hydrochloride are added. The mixture is stirred magnetically for 45 minutes and the precipitated sodium chloride is filtered off and washed with 20 ml. of methyl alcohol. 3 g. (0.013 g. mol) of methyl 6-chloro-3-cyclopropylamino-pyrazinoate are added to the filtrate then completey dissolved therein by rapidly warming the solution to 35–40° C. The mixture is then immediately cooled in ice to about +10° C., stirred mechanically for 10 minutes, and then left for one hour at 0° C. The resulting precipitate is filtered off, washed with methyl alcohol and dried in vacuo over phosphorus pentoxide. 2 g. (61% yield) of 6-chloro-3-cyclopropylamino-pyrazinoyl)-guanidine are thus obtained. After recrystallisation from 125 ml. of a mixture of nitromethane and dimethylformamide (4:1) this material is in the form of a yellow crystalline substance which melts at 260–265° C. with decomposition.

Analysis.—Calculated for $C_9H_{11}ClN_6O$ (percent) (M.W.=254.5): C, 42.44; H, 4.32; Cl, 13.95; N, 33.00. Found (percent): C, 42.24; H, 4.34; Cl, 13.82; N, 32.96.

EXAMPLE II (a) Methyl 6-bromo-3-cyclopropylamino-pyrazinoate 10.9 g. (0.192 g. mol) of cyclopropylamine are added to a solution of 28.4 g. (0.096 g. mol) of methyl 3,6-dibromo-pyrazinoate in 140 ml. of dimethylsulphoxide. This mixture is heated for one hour to 65° C. with stirring, then left for 3 hours at ambient temperature and poured onto 300 g. of crushed ice. The solid precipitate is filtered off, washed and recrystallised from 110 ml. of methyl alcohol. 17.5 g. (67% yield) of methyl 6-bromo-3-cyclopropylamino-pyrazinoate are thus obtained, as a crystalline light yellow compound which melts at 91–93° C. A further 1.3 g. (72% total yield) of the compound are recovered from the recrystallisation of the mother liquors.

Analysis.—Calculated for $C_9H_{10}BrN_3O$ (percent) (M.W.=272): C, 39.72; H, 3.68; Br, 29.39; N, 15.45. Found (percent): C, 39.52; H, 3.75; Br. 29.31; N, 15.58.

(b) (6-bromo-3-cyclopropylamino-pyrazinoyl)-guanidine 1.7 g. (0.075 g. atom) of sodium are dissolved in 100 ml. of anhydrous methyl alcohol and 7.4 g. (0.017 g. mol) of guanidine hydrochloride in 100 ml. of methyl alcohol are added to this solution. The mixture is cooled, the precipitated sodium chloride filtered off and washed with methyl alcohol, 5.4 g. (0.02 g. mol) of methyl 6-bromo-3-cyclopropylamino-pyrazinoate are added to the filtrate, and dissolved therein by heating the mixture rapidly to 35–40° C. The solution is immediately cooled to +10° C., stirred magnetically for 15 minutes and then cooled to 0° C. The resulting precipitate is filtered off, washed with methyl alcohol and dried in vacuo over phosphorus pentoxide. 4.5 g. (75% yield) of 6-bromo-3-cyclopropylamino-pyrazinoyl)-guanidine are thus obtained. After recrystallisation from a mixture of nitromethane and dimethylformamide (4:1) this material is in the form of a yellow crystalline compound which melts about 265° C. with decomposition.

Analysis.—Calculated for $C_9H_{11}BrN_6O$ (percent) (M.W.=299): C, 36.13; H, 3.68; Br, 26.73; N, 28.10. Found (percent): C, 36.18; H, 3.66; Br, 26.83; N, 28.19.

EXAMPLE III (a) Methyl 6-chloro-3-cyclopropyl-methylamino-pyrazinoate 20.5 g. (0.288 g. mol) of cyclopropylmethylamine are added to asolution of 36.4 g. (0.144 g. mol) of methyl 6-chloro-3-bromo-pyrazinoate in 230 ml. of dimethylsulphoxide. The mixture is heated for one hour to 65° C. with stirring, left for 2 hours at ambient temperature, and then poured onto 500 g. of crushed ice while the temperature is kept below +10° C. with an external ice bath. The precipitate is filtered off, washed with water and recrystallised from 50 ml. of absolute ethanol. 13.8 g. (40% yield) of methyl 6-chloro-3-cyclopropylmethylamino-pyrazinoate are thus obtained, as a yellow crystalline compound which melts at 94–95° C.

Analysis.—Calculated for $C_{10}H_{12}ClN_3O_2$ (percent) (M.W.=241.5): C, 49.69; H, 4.97; Cl, 14.70; N, 17.39. Found (percent): C, 48.84; H, 4.91; Cl, 15.09; N, 17.45.

(b) (6-chloro-3-cyclopropylmethylamino-pyrazinoyl)-guanidine 2.6 g. (0.1114 g. atom) of sodium are dissolved in 350 ml. of anhydrous methyl alcohol and 10.9 g. (0.14 g. mol) of guanidine hydrochloride are added to this solution. The mixture is stirred magnetically for 30 minutes and the precipitated sodium chloride is filtered off and washed with 70 ml. of methyl alcohol. 6.9 g. (0.0285 g. mol) of methyl 6-chloro-3-cyclopropylmethylaminopyrazinoate are added to the filtrate and dissolved completely while the solution is rapidly warmed to 45° C. The solution is immediately afterwards cooled in ice to +15° C., and left for one hour at ambient temperature. The precipitate formed is filtered off washed with methyl alcohol, dried in vacuo over phosphorus pentoxide, and recrystallised from 140 ml. of a mixture of nitromethane and dimethylformamide (2:1). 3.4 g. (44.5% yield) of 6-chloro-3-cyclopropylmethylamino-pyrazinoyl)-guanidine are thus obtained as a yellow crystalline compound which melts at 265° C. with decomposition.

*Analysis.* — Calcd. for $C_{10}H_{13}ClN_6O$ (percent) (M.W.=268.5):

C, 44.69; H, 4.84; Cl, 13.22; N, 31.29. Found (percent): C, 44.67; H, 4.78; Cl, 13.23; N, 31.26.

EXAMPLE IV

Experiments were carried out with groups of Sherman male rats weighing from 100 to 120 g., deprived of food 18 hours before the beginning of experiments but having drinking water at will.

In each experiment:

In the control group, each animal received 2.5 ml. of NaCl physiological solution intraperitoneally at the beginning of the experiment, In the other groups (hydrochlorothiazide group or for short HCT group and the groups of the invention) each animal received 2.5 ml. (i.p.) of a 0.4% solution of hydrochlorothiazide (solubilized by means of an equimolecular amount of sodium hydroxide) in physiological solution, the amount of hydrochlorothiazide thus administered being 100 mg./kg.

Ten minutes after intraperitoneal injections in the animals of the various groups:

5 ml./100 g. of NaCl physiological solution were administered orally to each animal in the control group and the HCT group, 5 or 10 mg./kg. of a pyrazine compound suspended in physiological serum (5 ml./100 g.) were administered orally to each animal in the groups of the invention.

Urines were collected during the 7 hours after the beginning of the experiment, the animals being placed in individual cages. The volume of urine from each animal was measured, and Na, K and Cl therein estimated. The logarithm $$\log \frac{Na \times 10}{K}$$

for each animal was calculated, and the average value of the logarithm in each group was also calculated.

The results of the experiment are tabulated below:

EXAMPLE V

Simple formulations (1) Capsules: Mg.
  6-chloro 3-cyclopropylmethyl amino pyrazinoyl guanidine _____ 50–150
  Lactose _____ 198
  Magnesium stearate _____ 2

(2) Tablets:
  6-chloro 3-cyclopropylmethyl amino pyrazinoyl guanidine _____ 50–150
  Tricalcium phosphate _____ 110
  Starch _____ 18
  Magnesium stearate _____ 2

(3) Suppositories:
  6-chloro 3-cyclopropylmethyl amino pyrazinoyl guanidine _____ 50–150
  Excipient for suppositories _____ q.s.

EXAMPLE VI

Compound formulations (1) Capsules: Mg.
  (a) 6 - chloro 3 - cyclopropylmethyl amino-pyrazinoyl guanidine _____ 50–150
    3 - parafluorophenyl-methyl 7-sulphamyl 6 - chloro 1,1-dioxide 3,4-dihydro 1,2,4 benzothiadiazine _____ 25–5
    Lactose _____ 193
    Magnesium stearate _____ 2
  (b) 6 - chloro 3 - cyclopropylmethyl amino pyrazinoyl guanidine _____ 50–150
    Hydrochlorothiazide _____ 25–50
    Lactose _____ 193
    Magnesium stearate _____ 2

(c) 6-chloro 3-cyclopropylmethyl amino pyrazinoyl guanidine _____ 50–150
    Acetazolamide _____ 50–250
    Magnesium stearate _____ 2

(2) Tablets:

(a) 6-chloro 3-cyclopropylmethyl amino pyrazinoyl guanidine _____ 50–150
    3 parafluorophenylmethyl-7-sulphamyl 6-chloro 3,4 - dihydro 1,2,4 - benzothiadiazine _____ 2.5–5
    Tricalcium phosphate _____ 110
    Starch _____ 18
    Magnesium stearate _____ 2

| Groups | Urine vol. in 7 hours per kg. (ml.) | K+ in 7 hours per kg. (meq.) | Na+ in 7 hours per kg. (meq.) | Cl- in 7 hours per kg. (meq.) | log Na×10/K |
|---|---|---|---|---|---|
| Control | 24±13 | 0.7±0.2 | 5±0.9 | 4.8±0.5 | 1.8±0.1 |
| HCT | 70±9 | 1.5±0.1 | 12±1 | 11±0.9 | 1.9±0.1 |
| HCT+6-chloro 3-N-cyclopropyl methylamino-2-pyrazinoyl guanidine (5 mg./kg.) | 66±6 | 0.9±0.4 | 12.5±0.3 | 10.7±0.3 | 2.2±0.2 |
| HCT+6-chloro 3-N-cyclopropyl amino-2-pyrazinoyl guanidine (10 mg./kg.) | 83±4 | 1.4±0.3 | 13.6±1.3 | 12.1±0.5 | 2±0.1 |
| HCT+6-chloro 3-N-butylamino 2-pyrazinoyl-guanidine (10 mg./kg.) | 73±10 | 2.2±0.2 | 12.8±2 | 11.5±1.5 | 1.7±0.1 |
| HCT+6-chloro 3-amino-2-pyrazinoyl guanidine (10 mg./kg.) | 68±3 | 0.8±0.2 | 13±1.5 | 11.7±1.8 | 2.2±0.1 |
| HCT+6-chloro 3-N-phenylamino 2-pyrazinoyl guanidine (10 mg./kg.) | 64±10 | 1.9±0.4 | 10.7±0.7 | 10.4±1.3 | 1.8±0.1 |
| HCT+6-chloro 3-N-benzylamino 2-pyrazinoyl guanidine (10 mg./kg.) | 74±10 | 1.7±0.5 | 12±1.2 | 12±1 | 1.8±0.1 |

The results shown in the table, in particular the figures for $$\log \frac{Na \times 10}{K}$$

show that the cyclopropylmethyl derivative is the most active among the compounds employed.

(b) 6-chloro 3-cyclopropylmethyl amino pyrazinoyl guanidine _____ 50–150
    Hydrochlorothiazide _____ 25–50
    Tricalcium phosphate _____ 110
    Starch _____ 18
    Magnesium stearate _____ 2

EXAMPLE VI—Continued
COMPOUND FORMULATIONS (2) Tablets:

|   | Mg. |
|---|---|
| (c) 6-chloro 3-cyclopropylmethyl amino pyrazinoyl guanidine | 50–150 |
| Acetazolamide | 50–250 |
| Magnesium stearate | 2 |

(3) Suppositories:

| | Mg. |
|---|---|
| (a) 6-chloro 3-cyclopropylmethyl amino pyrazinoyl guanidine | 50–150 |
| 3 parafluorophenyl-methyl 7 - sulphamyl 6 - chloro 3,4-dihydro 1,2,4-benzothiadiazine | 2.5–5 |
| Excipient for suppositories | q. s. |
| (b) 6-chloro 3-cyclopropylmethyl amino pyrazinoyl guanidine | 50–150 |
| Hydrochlorothiazide | 25–50 |
| Excipient for suppositories | q. s. |
| (c) 6-chloro 3-cyclopropylmethyl amino pyrazinoyl guanidine | 50–150 |
| Acetazolamide | 50–100 |
| Excipient for suppositories | q. s. |

We claim:
1. A pyrazinoyl-guanidine of the formula:

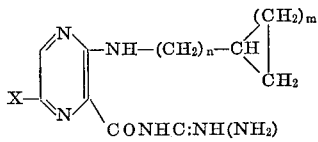

in which X is a halogen or a trihalogenomethyl radical, $m$ is an integer from 1 to 4; and $n$ is an integer from 0 to 3 and its acid addition salts.

2. A pyrazinoyl-guanidine according to claim 1 which is (6-chloro - 3 - cyclopropyl-methylamino-pyrazinoyl) guanidine and its pharmaceutically acceptable acid addition salts.

References Cited
UNITED STATES PATENTS 3,240,780   3/1966   Cragoe et al. _____ 260—250

NICHOLAS S. RIZZO, Primary Examiner

U.S. Cl. X.R.

424—250

PO-1050
(5/69)

UNITED STATES PATENT OFFICE
CERTIFICATE OF CORRECTION

Patent No. 3,573,303      Dated March 30, 1971

Inventor(s) GIUDICELLI et al.

It is certified that error appears in the above-identified patent and that said Letters Patent are hereby corrected as shown below:

The heading of the patent is amended to read:

No drawing. Filed Sept. 18, 1968, Ser. No. 760,670
Claims Priority, applications France Sept.20 , 1967
and Oct. 19, 1967, 121,577 and 125,036
    Int. Cl. Co7d 51/76

Signed and sealed this 9th day of November 1971.

(SEAL)
Attest:

EDWARD M.FLETCHER,JR.       ROBERT GOTTSCHALK
Attesting Officer      Acting Commissioner of Patents